(12) United States Patent
Richardson

(10) Patent No.: US 10,118,842 B2
(45) Date of Patent: Nov. 6, 2018

(54) DEIONIZING FLUID FILTER DEVICES AND METHODS OF USE

(71) Applicant: Imagine TF, LLC, Los Gatos, CA (US)

(72) Inventor: Brian Edward Richardson, Los Gatos, CA (US)

(73) Assignee: Imagine TF, LLC, Los Gatos, CA (US)

(*) Notice: Subject to any disclaimer, the term of this patent is extended or adjusted under 35 U.S.C. 154(b) by 286 days.

(21) Appl. No.: 15/201,253

(22) Filed: Jul. 1, 2016

(65) Prior Publication Data

US 2017/0008781 A1    Jan. 12, 2017

Related U.S. Application Data

(60) Provisional application No. 62/231,601, filed on Jul. 9, 2015.

(51) Int. Cl.
| | |
|---|---|
| *B01D 39/14* | (2006.01) |
| *B81B 1/00* | (2006.01) |
| *C02F 1/42* | (2006.01) |
| *C02F 1/40* | (2006.01) |
| *C02F 1/48* | (2006.01) |
| *C02F 5/00* | (2006.01) |
| *C02F 1/00* | (2006.01) |
| *C02F 103/08* | (2006.01) |

(52) U.S. Cl.
CPC ............... *C02F 1/48* (2013.01); *C02F 1/001* (2013.01); *C02F 5/00* (2013.01); *C02F 2103/08* (2013.01)

(58) Field of Classification Search
CPC ...... B01D 29/21; B01D 29/15; B01D 29/232; B01D 2201/12; B01D 29/07; B01D 29/46; C02F 1/48; C02F 2103/08; C02F 1/001; C02F 5/00
See application file for complete search history.

(56) References Cited

U.S. PATENT DOCUMENTS

| | | |
|---|---|---|
| 1,977,174 A | 10/1934 | Crawford |
| 3,250,396 A | 5/1966 | Armstrong et al. |
| 3,335,946 A | 8/1967 | Putterlik |
| 3,884,805 A | 5/1975 | Bagdasarian et al. |

(Continued)

FOREIGN PATENT DOCUMENTS

| | | |
|---|---|---|
| CN | 203139755 U | 8/2013 |
| CN | 106029202 A | 10/2016 |
| EP | 0639223 B1 | 3/1996 |
| EP | 1196242 | 4/2002 |
| EP | 1197255 | 4/2002 |

(Continued)

OTHER PUBLICATIONS

Brown, R.C., "Electrically Charged Filter Materials," Engineering Science and Education Journal 1.2 (1992): 71-79.

(Continued)

*Primary Examiner* — Ana M Fortuna
(74) *Attorney, Agent, or Firm* — Keith Kline; The Kline Law Firm PC

(57) ABSTRACT

Deionizing fluid filter devices and methods of use are described herein. An example filter device comprises a plurality of stacked panels that comprise filter structures. The filter structures comprise filter features that filter a fluid. The fluid is processed by the filter device such that filtered fluid is output as well as a concentrate of particulate matter extracted from the fluid.

19 Claims, 24 Drawing Sheets

(56) References Cited

U.S. PATENT DOCUMENTS

| | | |
|---|---|---|
| 3,948,779 A | 4/1976 | Jackson |
| 4,267,045 A | 5/1981 | Hoof |
| 4,410,430 A | 10/1983 | Hagler, Jr. |
| 4,423,090 A | 12/1983 | Hammond, Jr. et al. |
| 4,430,232 A | 2/1984 | Doucet |
| 4,478,769 A | 10/1984 | Pricone et al. |
| 4,486,363 A | 12/1984 | Pricone et al. |
| 4,601,861 A | 7/1986 | Pricone et al. |
| 4,620,917 A | 11/1986 | Nozawa et al. |
| 4,668,558 A | 5/1987 | Barber |
| 4,797,175 A | 1/1989 | Ellion et al. |
| 4,842,739 A | 6/1989 | Tang |
| 4,842,794 A | 6/1989 | Hovis et al. |
| 4,891,120 A | 1/1990 | Sethi et al. |
| 4,902,420 A | 2/1990 | Pall et al. |
| 4,960,449 A | 10/1990 | Yonushonis |
| 4,971,769 A | 11/1990 | Haerle |
| 5,009,857 A | 4/1991 | Haerle |
| 5,100,551 A | 3/1992 | Pall et al. |
| 5,200,073 A | 4/1993 | Steere et al. |
| 5,204,690 A | 4/1993 | Lorenze, Jr. et al. |
| 5,207,962 A | 5/1993 | Hovis et al. |
| 5,262,107 A | 11/1993 | Hovis et al. |
| 5,290,447 A | 3/1994 | Lippold |
| 5,417,858 A * | 5/1995 | Derrick .............. B01D 29/012 210/388 |
| 5,505,852 A | 4/1996 | van Rossen |
| 5,552,046 A | 9/1996 | Johnston et al. |
| 5,568,819 A | 10/1996 | Gentry et al. |
| 5,645,704 A | 7/1997 | Axtman |
| 5,985,164 A | 11/1999 | Chu et al. |
| 6,273,938 B1 | 8/2001 | Fanselow et al. |
| 6,274,035 B1 | 8/2001 | Yuan et al. |
| 6,280,824 B1 * | 8/2001 | Insley .............. B01D 39/1607 428/172 |
| 6,284,072 B1 | 9/2001 | Ryan et al. |
| 6,306,300 B1 | 10/2001 | Harding et al. |
| 6,346,192 B2 | 2/2002 | Buhr et al. |
| 6,375,870 B1 | 4/2002 | Visovsky et al. |
| 6,391,097 B1 | 5/2002 | Rosenberg |
| 6,471,746 B2 | 10/2002 | Hagglund et al. |
| 6,524,488 B1 | 2/2003 | Insley et al. |
| 6,589,317 B2 | 7/2003 | Zhang et al. |
| 6,632,357 B1 | 10/2003 | Barger et al. |
| 6,685,833 B2 | 2/2004 | Lippold |
| 6,685,841 B2 | 2/2004 | Lopez et al. |
| 6,746,890 B2 | 6/2004 | Gupta et al. |
| 6,748,978 B2 | 6/2004 | Pezzuto et al. |
| 6,752,889 B2 | 6/2004 | Insley et al. |
| 6,761,962 B2 | 7/2004 | Bentsen et al. |
| 6,827,906 B1 | 12/2004 | Bjornson et al. |
| 6,872,302 B2 | 3/2005 | Aste |
| 6,915,566 B2 | 7/2005 | Abbott et al. |
| 6,936,086 B2 | 8/2005 | Harkonen et al. |
| 7,032,426 B2 | 4/2006 | Durney et al. |
| 7,048,848 B2 | 5/2006 | Assion |
| 7,081,208 B2 | 7/2006 | McCullough et al. |
| 7,104,406 B2 | 9/2006 | Chen et al. |
| 7,122,068 B2 | 10/2006 | Tate et al. |
| 7,163,733 B2 | 1/2007 | Bourdelais et al. |
| 7,217,562 B2 | 5/2007 | Cao et al. |
| 7,223,364 B1 | 5/2007 | Johnston et al. |
| 7,238,255 B2 | 7/2007 | Derand et al. |
| 7,282,148 B2 | 10/2007 | Dalton et al. |
| 7,323,105 B1 | 1/2008 | Janikowski et al. |
| 7,425,227 B1 | 9/2008 | Hutchison et al. |
| 7,442,303 B2 | 10/2008 | Jacobson |
| 7,531,120 B2 | 5/2009 | Van Rijn et al. |
| 7,569,139 B2 | 8/2009 | Mihlbauer et al. |
| 7,588,619 B2 | 9/2009 | Chilton et al. |
| 7,645,383 B2 | 1/2010 | Kadel et al. |
| 7,784,619 B2 | 8/2010 | Jacobson |
| 7,857,978 B2 | 12/2010 | Jensen et al. |
| 7,901,758 B2 | 3/2011 | Rasmussen |
| 7,922,795 B2 | 4/2011 | Striemer et al. |
| 7,959,780 B2 | 6/2011 | Hawkins et al. |
| 7,988,840 B2 | 8/2011 | Huang et al. |
| 8,025,854 B2 | 9/2011 | Ohman et al. |
| 8,083,941 B2 | 12/2011 | Chien |
| 8,179,381 B2 | 5/2012 | Frey et al. |
| 8,186,913 B2 | 5/2012 | Toner et al. |
| 8,197,775 B2 | 6/2012 | Johnston et al. |
| 8,273,245 B2 | 9/2012 | Jovanovic et al. |
| 8,277,759 B2 | 10/2012 | Sundberg et al. |
| 8,282,799 B2 | 10/2012 | Huang et al. |
| 8,297,449 B2 | 10/2012 | Afzali-Ardakani et al. |
| 8,304,230 B2 | 11/2012 | Toner et al. |
| 8,328,022 B2 | 12/2012 | Mbadinga-Mouanda et al. |
| 8,679,336 B2 | 3/2014 | Hongo et al. |
| 2002/0060183 A1 | 5/2002 | Paul et al. |
| 2002/0125192 A1 | 9/2002 | Lopez et al. |
| 2002/0185003 A1 | 12/2002 | Potter |
| 2003/0104170 A1 | 6/2003 | Johnston et al. |
| 2003/0118781 A1 | 6/2003 | Insley et al. |
| 2004/0159319 A1 | 8/2004 | Kadel et al. |
| 2005/0179150 A1 | 8/2005 | Bharadwaj et al. |
| 2006/0049105 A1 * | 3/2006 | Max .............. B01D 57/02 210/650 |
| 2006/0219627 A1 | 10/2006 | Rodgers et al. |
| 2007/0020772 A1 | 1/2007 | Cao et al. |
| 2007/0151920 A1 | 7/2007 | Kay |
| 2007/0246433 A1 | 10/2007 | Zuberi |
| 2007/0251867 A1 | 11/2007 | Mihlbauer et al. |
| 2008/0012151 A1 | 1/2008 | Kemppainen et al. |
| 2008/0014410 A1 | 1/2008 | Johnston et al. |
| 2008/0296238 A1 | 12/2008 | Haldopoulos et al. |
| 2009/0102094 A1 | 4/2009 | Golden et al. |
| 2009/0120874 A1 | 5/2009 | Jensen et al. |
| 2009/0149345 A1 | 6/2009 | Nishi et al. |
| 2010/0028604 A1 | 2/2010 | Bhushan et al. |
| 2010/0216126 A1 | 8/2010 | Balachandran et al. |
| 2010/0317132 A1 | 12/2010 | Rogers et al. |
| 2011/0100900 A1 | 5/2011 | Drury et al. |
| 2011/0240476 A1 | 10/2011 | Wang et al. |
| 2012/0006760 A1 | 1/2012 | Toner et al. |
| 2012/0037544 A1 | 2/2012 | Lane et al. |
| 2012/0244311 A1 | 9/2012 | Manninen |
| 2012/0244314 A1 | 9/2012 | Scheibner et al. |
| 2012/0261331 A1 | 10/2012 | Ter Horst et al. |
| 2012/0261333 A1 | 10/2012 | Moran et al. |
| 2012/0267249 A1 | 10/2012 | Cotte et al. |
| 2012/0273990 A1 | 11/2012 | O'Donnell et al. |
| 2013/0008848 A1 | 1/2013 | Jonsson et al. |
| 2013/0078163 A1 | 3/2013 | Chung et al. |
| 2014/0221544 A1 | 8/2014 | Lichtenhan et al. |
| 2014/0224658 A1 | 8/2014 | Richardson |
| 2015/0367257 A1 | 12/2015 | Richardson |
| 2016/0067634 A1 | 3/2016 | Richardson |
| 2016/0236120 A1 | 8/2016 | Richardson |
| 2017/0050407 A1 | 2/2017 | Richardson |
| 2017/0072349 A1 * | 3/2017 | Hofmeister .......... B01D 46/526 |
| 2017/0170060 A1 * | 6/2017 | Bao .............. H01L 23/485 |

FOREIGN PATENT DOCUMENTS

| | | |
|---|---|---|
| EP | 1449585 | 8/2004 |
| EP | 1254689 B1 | 9/2010 |
| EP | 2505047 | 10/2012 |
| WO | WO2011066055 | 6/2011 |
| WO | WO2014116183 | 7/2014 |
| WO | WO2015105524 | 7/2015 |
| WO | WO2015199663 | 12/2015 |
| WO | WO2016037150 | 3/2016 |
| WO | WO2016133929 A1 | 8/2016 |
| WO | WO2017007734 A1 | 1/2017 |

OTHER PUBLICATIONS

International Search Report and Written Opinion dated Aug. 28, 2014 in Application No. PCT/US2014/036439, filed May 1, 2014, 21 pages.

(56) References Cited

OTHER PUBLICATIONS

International Search Report and Written Opinion dated Dec. 1, 2014 in Application No. PCT/US2014/043942, filed Jun. 24, 2014, 14 pages.
International Search Report and Written Opinion dated Dec. 17, 2015 in Application No. PCT/US2015/048723, filed Sep. 4, 2015, 20 pages.
International Search Report and Written Opinion dated May 19, 2016 in Application No. PCT/US2016/018119, filed Feb. 16, 2016, 10 pages.
Patent Cooperation Treaty Application No. PCT/US2016/040878, "International Search Report" and "Written Opinion of the International Searching Authority," dated Sep. 19, 2016, 11 pages.

* cited by examiner

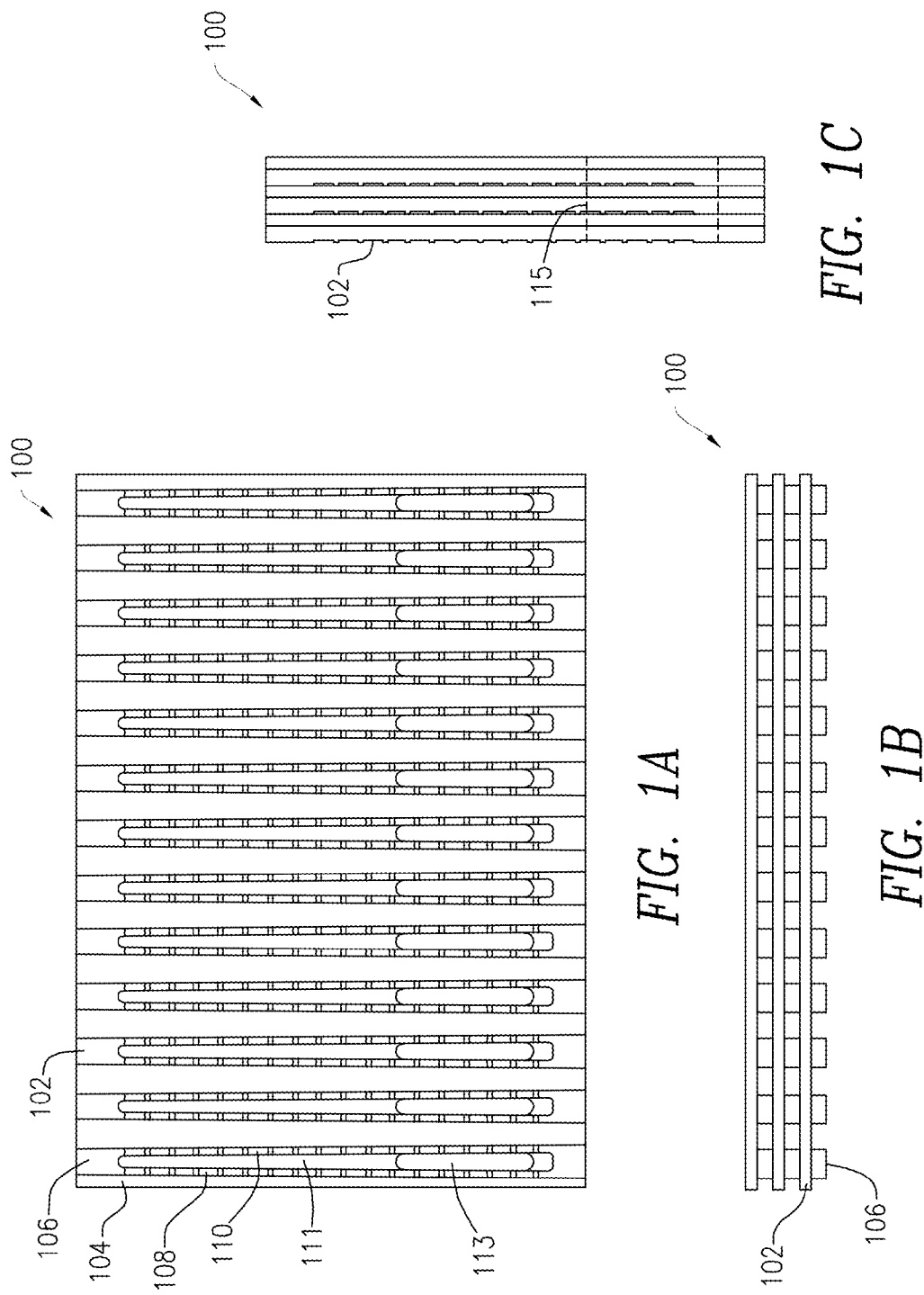

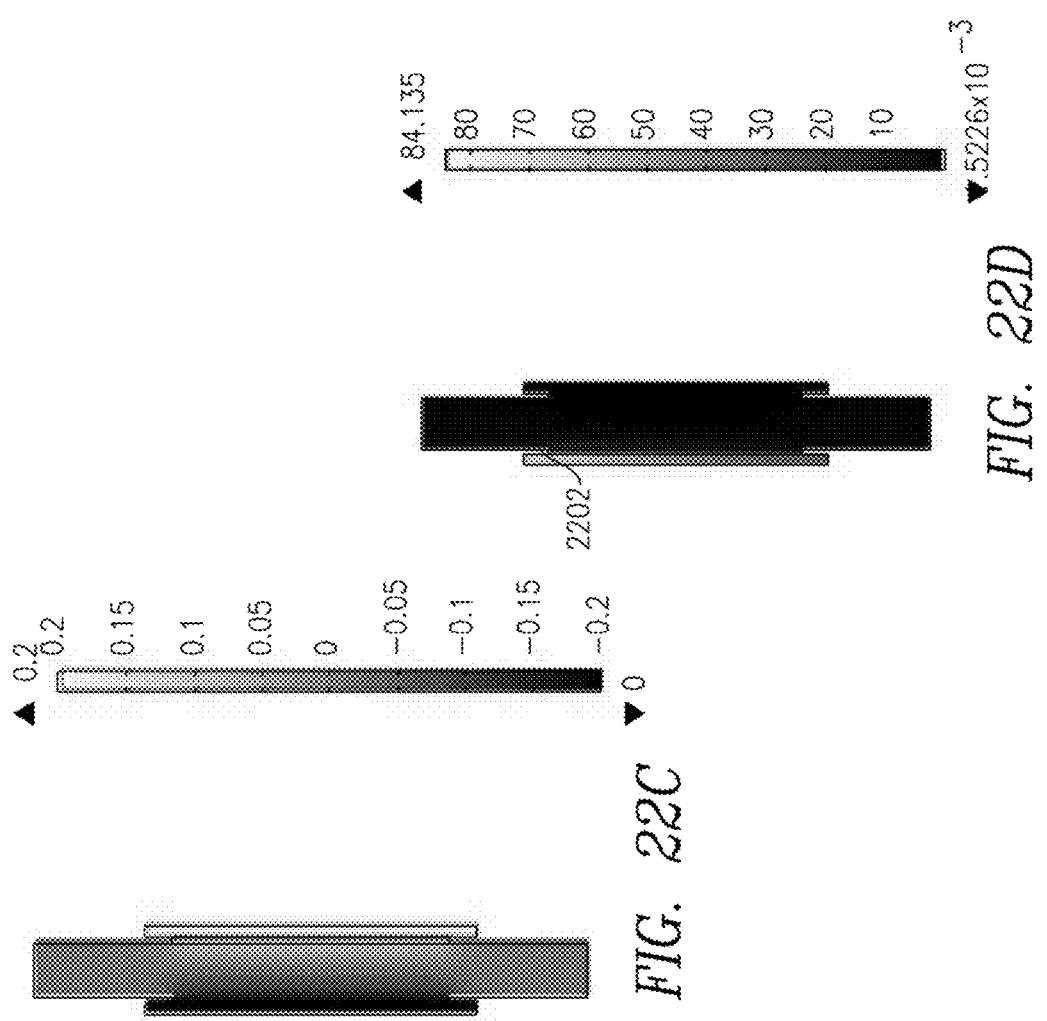

DEIONIZING FLUID FILTER DEVICES AND METHODS OF USE

CROSS REFERENCE TO RELATED APPLICATIONS

This application claims the benefit and priority of U.S. Provisional Application 62/231,601, filed on Jul. 9, 2015, which is hereby incorporated by reference herein in its entirety, including all references and appendices cited therein.

FIELD OF TECHNOLOGY

The present disclosure is generally directed to deionizing filters, and more particularly, but not by limitation, to deionizing filter panels and deionizing filter devices comprised of a stacked arrangement of deionizing filter panels, as well as methods of use to filter a fluid. In some embodiments the filter devices can be used in water desalinization and/or water softening. The filter devices can also be used to remove ions from wastewater, or selectively remove ions from any solution.

SUMMARY

Generally, the present disclosure is directed to unique micro-structured filter panels and filter devices that deionize fluids using charged surfaces and fluidic separation.

According to some embodiments, the present disclosure is directed to a filter panel, comprising: (a) a substrate; and (i) a plurality of filter structures extending from the substrate, the plurality of filter structures being spaced apart from one another to define a plurality of input boundaries on a top surface of the substrate and a plurality of output boundaries on a lower surface of the substrate, each of the plurality of filter structures comprising a pair of sidewalls spaced apart from one another, the pair of sidewalls comprising filter features that allow passage of fluid from the plurality of input boundaries into an outlet aperture formed by the spacing of the pair of sidewalls, and a filter port disposed within each outlet aperture.

According to some embodiments, the present disclosure is directed to a filter device, comprising: (a) a plurality of filter panels in a stacked arrangement, each comprising: (i) a substrate having a front surface and a back surface; and (ii) a plurality of filter structures extending from the front surface of the substrate, the plurality of filter structures being spaced apart from one another to define a plurality of input boundaries on a top surface of the substrate and a plurality of output boundaries on a lower surface of the substrate, each of the plurality of filter structures comprising a pair of sidewalls spaced apart from one another; the pair of sidewalls comprising filter features that allow passage of fluid from the plurality of input boundaries into an outlet aperture formed by the spacing of the pair of sidewalls, and a filter port disposed within each outlet aperture, wherein the plurality of filter panels are stacked so that the plurality of filter structures of one filter panel abuts the back surface of an adjacent filter panel.

According to some embodiments, the present disclosure is directed to a method for filtering a fluid, the method comprising: (a) introducing a fluid into a filter device, the filter device comprising: (i) a plurality of filter panels in stacked arrangement, each comprising: (1) a substrate having a front surface and a back surface; and (2) a plurality of filter structures extending from the front surface of the substrate, the plurality of filter structures being spaced apart from one another to define a plurality of input boundaries on a top surface of the substrate and a plurality of output boundaries on a lower surface of the substrate, each of the plurality of filter structures comprising a pair of sidewalls spaced apart from one another, the pair of sidewalls comprising filter features that allow passage of fluid from the plurality of input boundaries into an outlet aperture formed by the spacing of the pair of sidewalls, and a filter port disposed within each outlet aperture, wherein the plurality of filter panels are stacked so that the plurality of filter structures of one filter panel abuts the back surface of an adjacent filter panel; (b) wherein the fluid passes through the plurality of input boundaries, at least a portion of the fluid is filtered across the filter features of the plurality of filter structures, further wherein filtered fluid passes out of the filter device from the outlet cavities and a concentrate created by filtering the fluid exits from the plurality of output boundaries.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1A is a front elevation view of an example filter device, constructed in accordance with the present disclosure.

FIG. 1B is a top plan view of an example filter device, constructed in accordance with the present disclosure.

FIG. 1C is a side elevation view of an example filter device, constructed in accordance with the present disclosure.

FIGS. 22A-D illustrate various cut plot graphs a portion of a filtering plate of the example filter device of FIGS. 16-21.

DETAILED DESCRIPTION

Figure 2A:
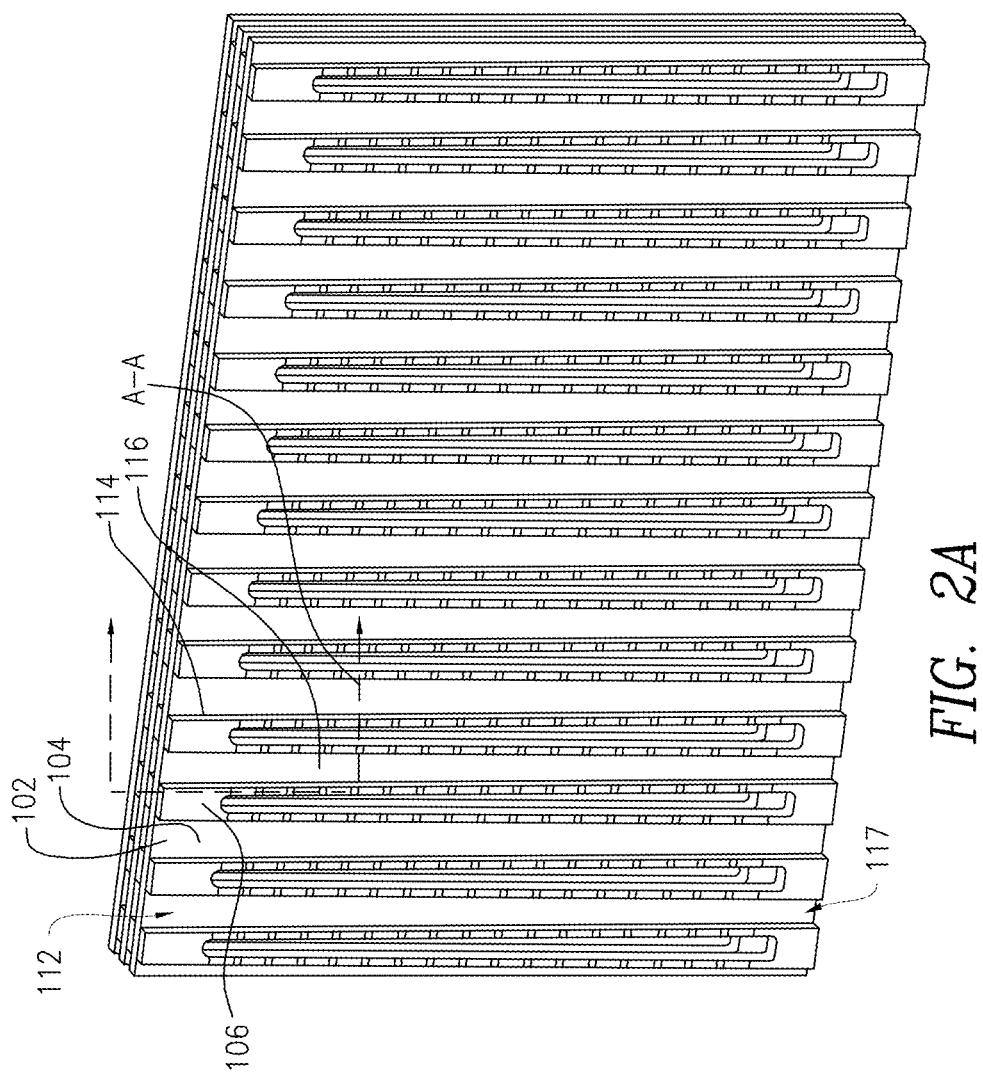
FIG. 2A is a perspective view of the example filter device of FIGS. 1A-C.

The present disclosure is directed to filter devices. In some embodiments, the filter devices are used for deionizing fluid. In one or more embodiments, the filter devices are stacked or layered structures comprised of a plurality of filtering panels. The filtering panels mate or abut one another to create filter features that filter particulates from a fluid that flows through the filter device. The filter devices produce both a filtered fluid output and also discharge concentrate extracted from the fluid.

Some embodiments, such as the embodiments of FIGS. 1A-13 provide filter structures with pores that are disposed near filtering surfaces with a high electric potential. Other embodiments, such as those illustrated in FIGS. 14 and 15 comprise filter structures with pores that are disposed away from filtering surfaces with a high electric potential.

In general, the embodiments described herein comprise filter panels and filter devices having unique microstructures. The filter panels also function to manage ions in a fluid flow. Some embodiments manage fluid flow with an exclusionary type ion field.

The embodiments of FIGS. 1-13 collect ions of a fluid one charge at a time (either positive or negative).

Illustrations of FIGS. 16-23 depict fluidic volume and flow, as well as collection of both positive and negative ions at the same time. The ions are separated from a dilute portion of the fluid.

Generally, the various embodiments described herein can be used to exclude or separate ions. Pore size (e.g., filter feature size) determines which ions are excluded or separated.

Referring now to FIGS. 1A-3, an example filter device 100 is comprised of a plurality of filter panels, such as filter panel 102 arranged into a layered or stacked configuration. The layering or stacking is best illustrated in the top down view of FIG. 1B.

The filter panel 102 comprises a substrate 104 having a plurality of filter structures, such as filter structure 106 extending from the substrate. It will be understood that the filter panel 102 can be manufactured from any number of materials (or combination of materials) such as plastics, polymers, metals, composite materials, natural materials, and so forth.

The filter structure 106 comprises a pair of sidewalls 108 and 110 that are spaced apart from one another to form a void or trench 111. Proximate a lower portion of the trench 111 is an outlet aperture 113. In some embodiments, the outlet apertures of the filter panels are identical in size and aligned with one another to form a continuous opening 115 (see FIG. 1C) from the front of the filter device 100 to the back of the filter device 100. In another embodiment the outlet apertures of the stacked panels are of differing size relative to one another.

Each of the pair of sidewalls 108 and 110 is provided with filter features as described below and illustrated with respect to FIG. 2A.

In some embodiments, the plurality of filter structures are spaced apart from one another to create a plurality of inlet boundaries, such as inlet boundary 112 that receive a fluid. Corresponding outlet boundaries, such as outlet boundary 117 are disposed on a lower end of the filter panel 102.

The spacing of filter structures, such as filter structure 106 and filter structure 114, creates primary filter channels (see primary filter channel 116).

Figure 2B:
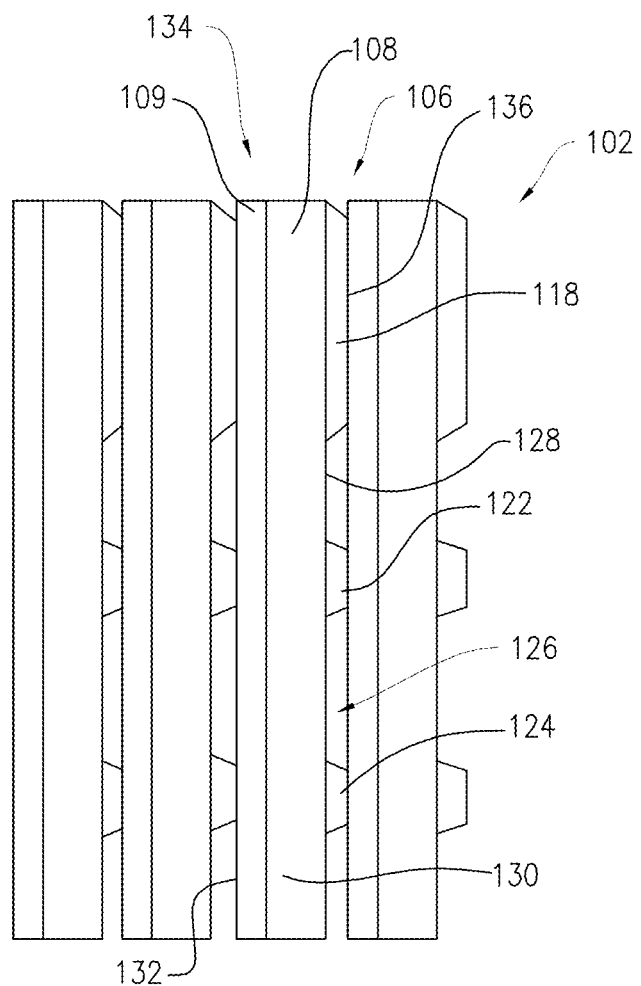
FIG. 2B is a cross sectional view of a portion of the filter device of FIG. 2A taken about line A-A.
Figure 3:
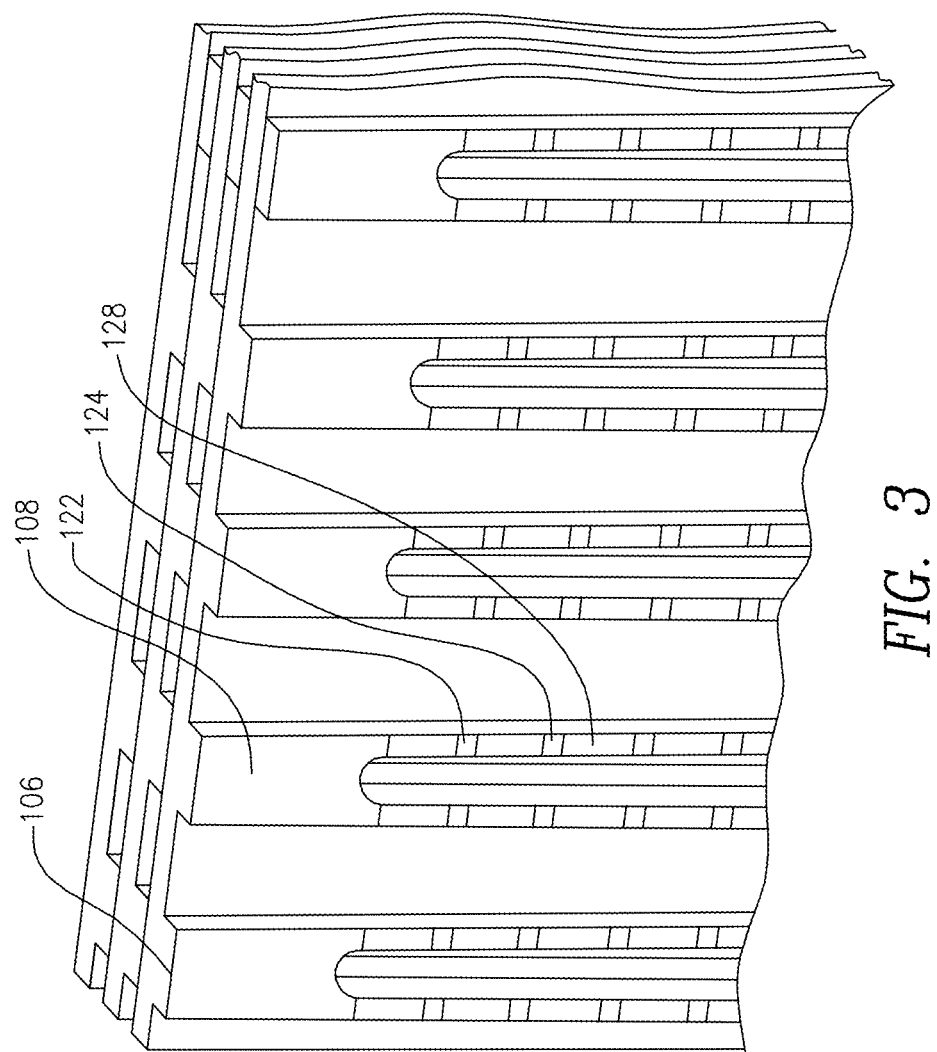
FIG. 3 is a close-up view of FIG. 2A.

FIG. 2B is a cross section view taken about line A-A (FIG. 2A). The abutting of two adjacent filter panels (filter panel 102 and filter panel 134) is illustrated. Each of the filter panels, such as filter panel 134 comprises a substrate 109 and a plurality of filter structures that extend from the substrate 109. A portion of filter structure 106, namely one of the pair of sidewalls, comprises an upper filter structure member 118 (a corresponding lower filter structure member is illustrated in FIG. 2A) and a plurality of spaced apart contact surfaces, such as contact surface 122. In between contact surface 122 and contact surface 124 is a space 126 created by the presence of a groove, notch, slit, opening, or shaped space on an upper surface 128 of the filter structure 106. These filter features are also illustrated in more detail in FIG. 3.

In some embodiments, the filter features direct and filter fluid in a path direction that is set at an angle relative to the fluid flow through the primary channels. For example, the flow through the filter features can be approximately orthogonal to the flow of fluid through the primary channels. In another embodiment the filter features are angled to direct the fluid at a downward angle to leverage gravity feeding of the fluid.

These spaces and contact surfaces extend along the upper surfaces of the filter structures. The spaces can be uniform in shape in some embodiments. In other embodiments the spaces can be of varying shape and/or size. The filter features can be microscopic or nano-scale structures.

In some embodiments, the substrate 109 comprises a front surface 130 and a back surface 132. When the filter panel 134 is abutted/stacked in mating relationship with an adjacent panel 102, the contact surfaces (such as contact surfaces 122 and 124) are placed in contact with a back surface 136 of the adjacent panel 102. This stacked relationship encloses an upper portion of the spaces to create pathways (e.g. filter features) of fluid communication (referred to herein as secondary filter channels) that filter a fluid.

A flow of fluid through the filter device 100 begins when the fluid enters the plurality of inlet boundaries of the filter device 100. Fluid flows into the primary channels between the plurality of filter features. A portion of the fluid flowing through the primary channels is directed into the filter features of the plurality of filter structures. The sizing of the filter features prevents particulates in the salinated water from passing into the trenches of the filter structures, effectively filtering the fluid. Filtered fluid passes into the trenches and out of the output apertures (collectively the continuous opening 115 illustrated in FIG. 1C) to exit the filter device 100.

Particulate matter is carried out of the bottom of the filter device 100 through the plurality of outlet boundaries (see outlet boundary 117 in FIG. 2A). In one embodiment, the fluid that passes through the primary channels will flush the particulate matter out of the filter device in a concentrate flow (e.g., fluid not diverted through the filter features that carries the filtered particulates).

Figure 4A:
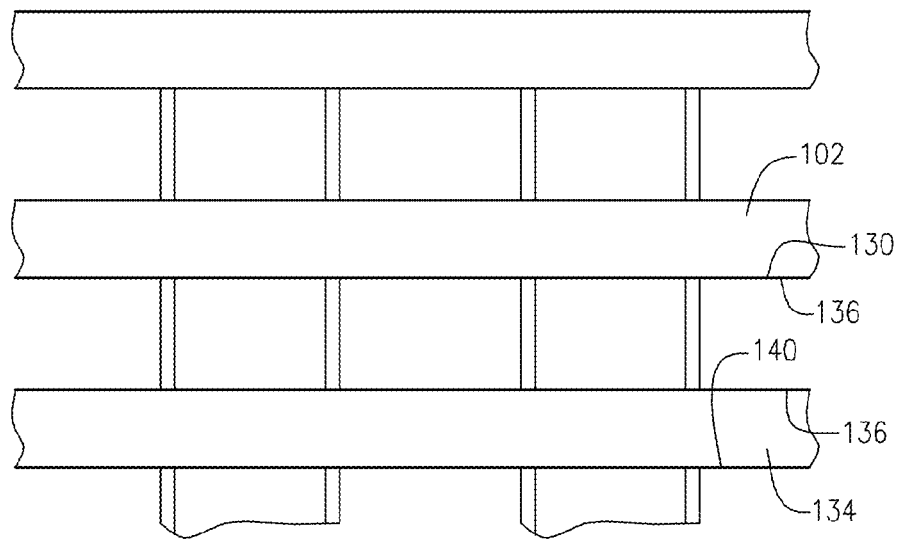
FIG. 4A is a close-up top down view of a portion of an example filter device illustrating electrically charged layering.

In FIG. 4A the front surface 130 of the filter panel 102 comprises a charged layer 138. The back surface 136 of the adjacent filter panel 134 is provided with a charged layer 140. Charged layer 138 can be either positively or negatively charged. Charged layer 140 can carry a charge that is opposite that of charged layer 138.

In some embodiments, the charge is static and requires little to no energy to maintain (other than leakage current).

Figure 4B:
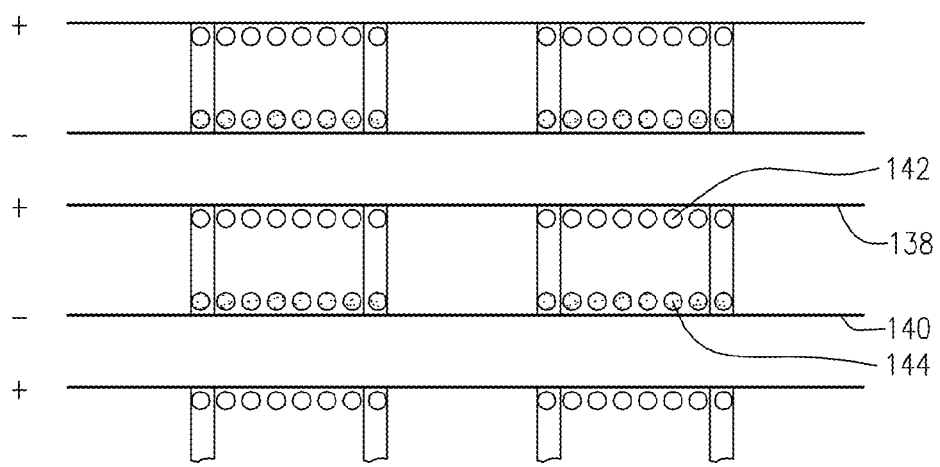
FIG. 4B is a close-up top down view of a portion of an example filter device illustrating anions and cations attracted by corresponding electrically charged layers.

In FIG. 4B, in one embodiment, charged layer 138 is positively charged to attract anions 142 in the fluid. Charged layer 140 is negatively charged to attract cations 144 in the fluid. In general, ions are forced to the substrates by the electric field generated by the charged layers. The charged layers can be created by application of a metallic layer to the surfaces of the filter panels.

Figure 5:
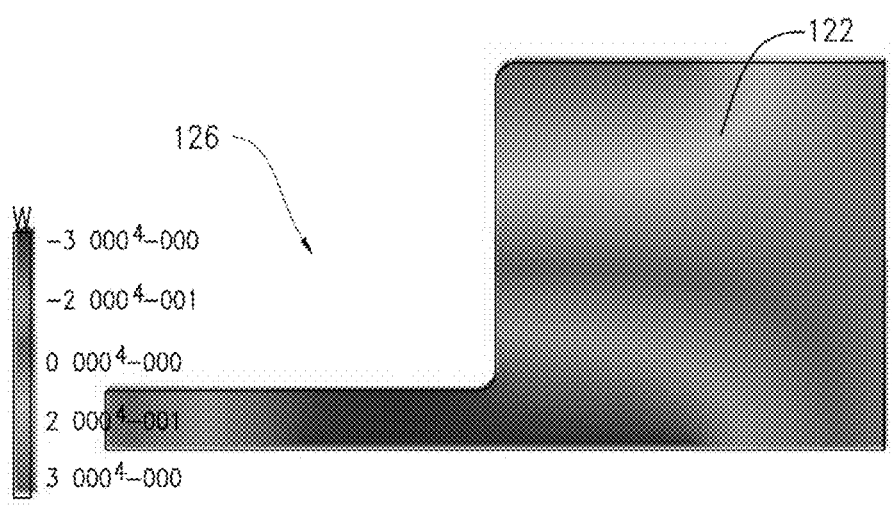
FIG. 5 is a graphical representation of an electric field simulation of a filter feature of an example filter device.

In FIG. 5, a portion of a filter structure, such as the contact surface 122 and space 126 is illustrated. When a positive charge is induced in the contact surface 122 a negative charge is created in the filter area (e.g., space 126). These graphical illustrations show where ions are excluded in the filter panel portion.

Figure 6:
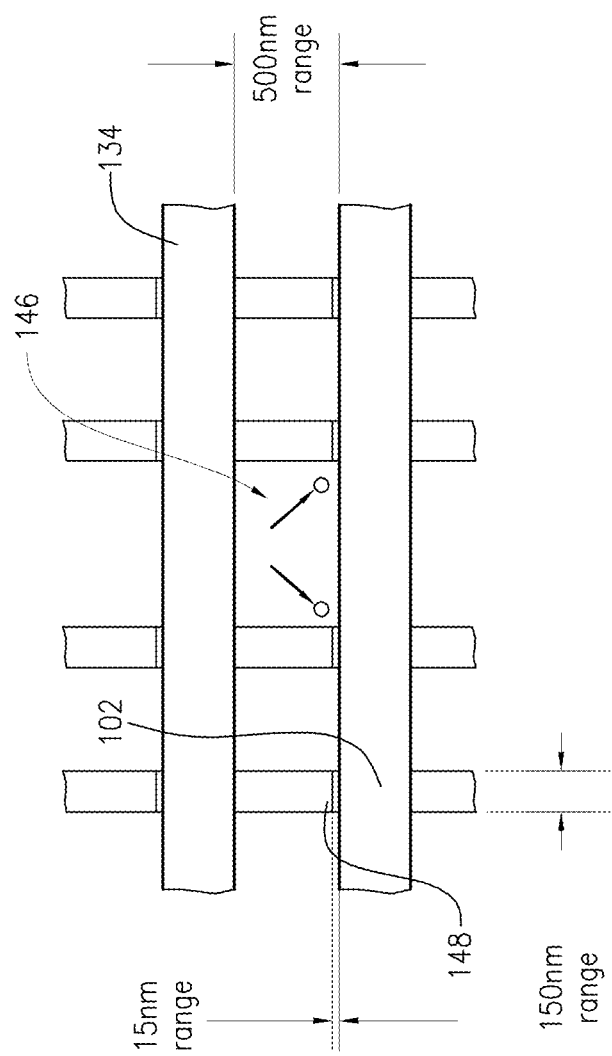
FIG. 6 is a close-up top down view of a portion of an example filter device illustrating particle filtering by filter features.

In FIG. 6 an example of sizing and spacing of adjacent filter panels is illustrated. Filter panel 102 and filter panel 134 are illustrated in stacked relationship. The energy required to force molecules 146 between the ions is a function of the chemical properties of the fluid, concentrations, and the types of ions. The filter features, such as filter feature 148 are approximately 15 nanometers. A height of the sidewalls of the filter structures is approximately 500 nanometers. A width of the sidewalls of the filter structures is approximately 150 nanometers.

Because of the large height and relatively short width of the filter feature 148 the required energy is low. In some embodiments, the electric fielded strength of each filter panel can be varied by varying the voltage applied across the fluid flow. In one embodiment, the surfaces of the filter panels (front and back) can comprise opposing charges. The surfaces are charged to a desired electric potential using any means that would be known to one of ordinary skill in the art with the present disclosure before them.

Figure 7:
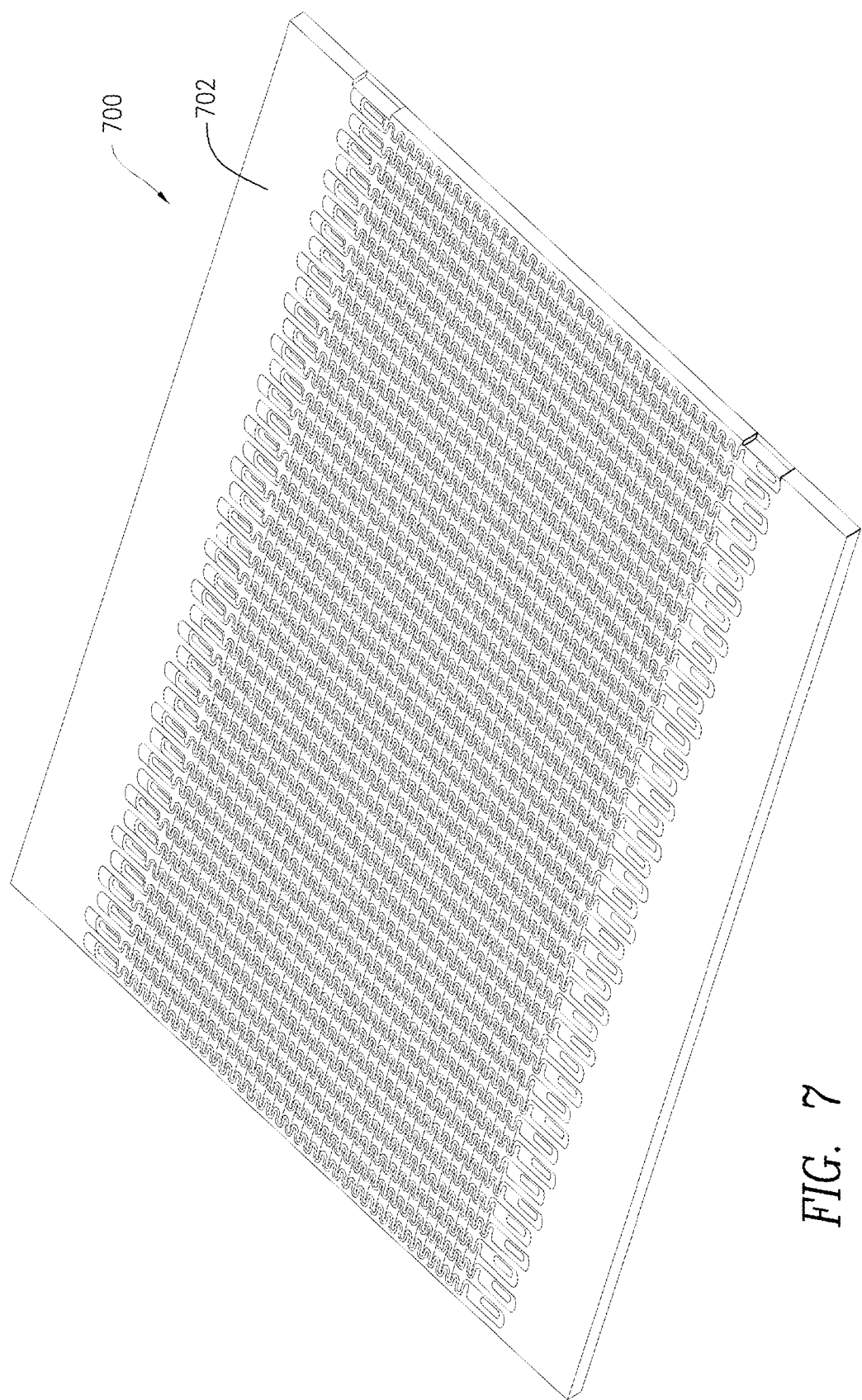
FIG. 7 is a perspective view of another example filter device of the present disclosure.

Another example filter panel 700 in FIG. 7 comprises a substrate 702 that is fabricated with a plurality of labyrinth filter structures and channels. Each filter structure terminates with an outlet aperture.

Figure 8:
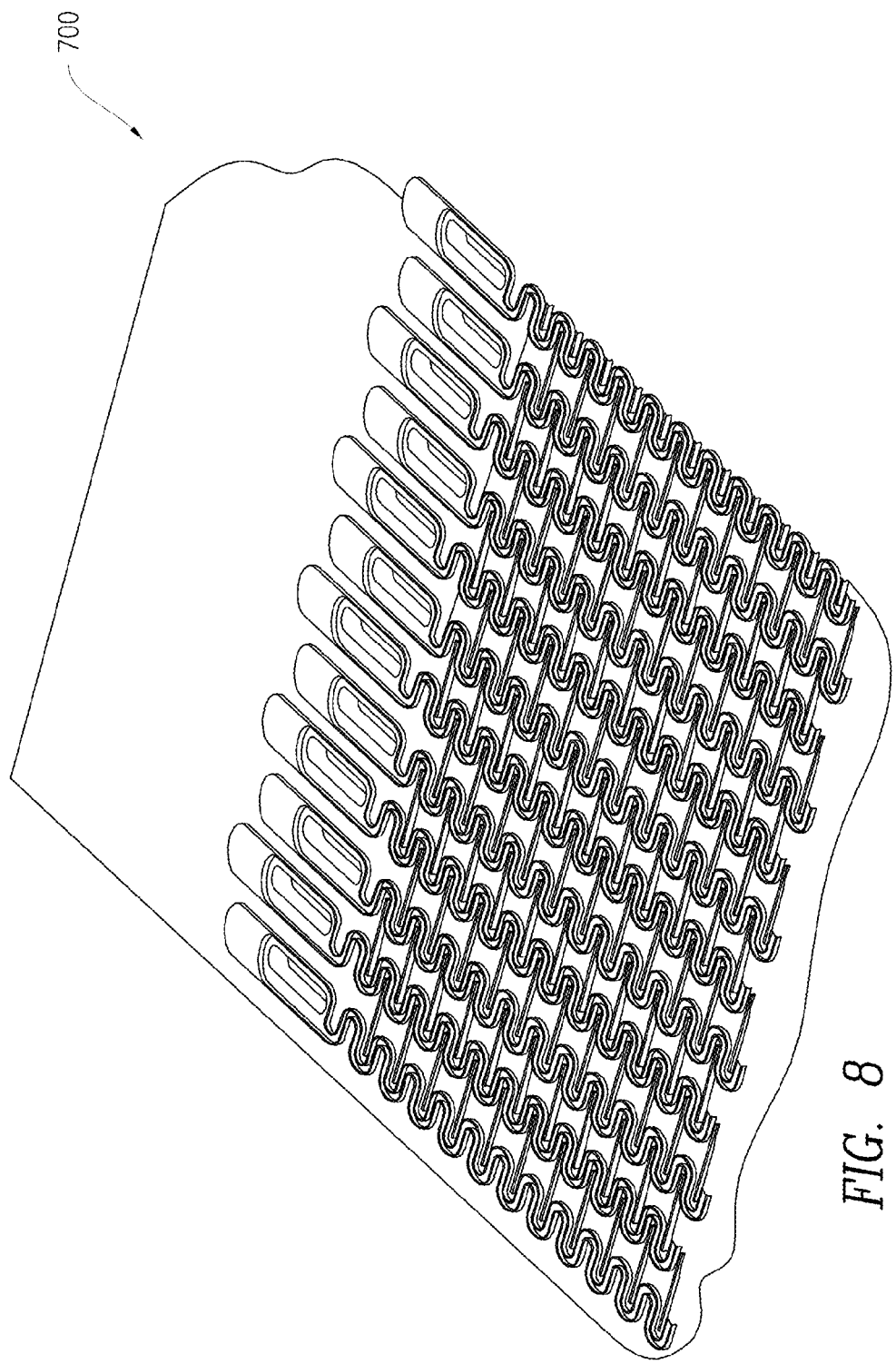
FIG. 8 is a close-up perspective view of the example filter device of FIG. 7 illustrating filtering labyrinths.
Figure 9:
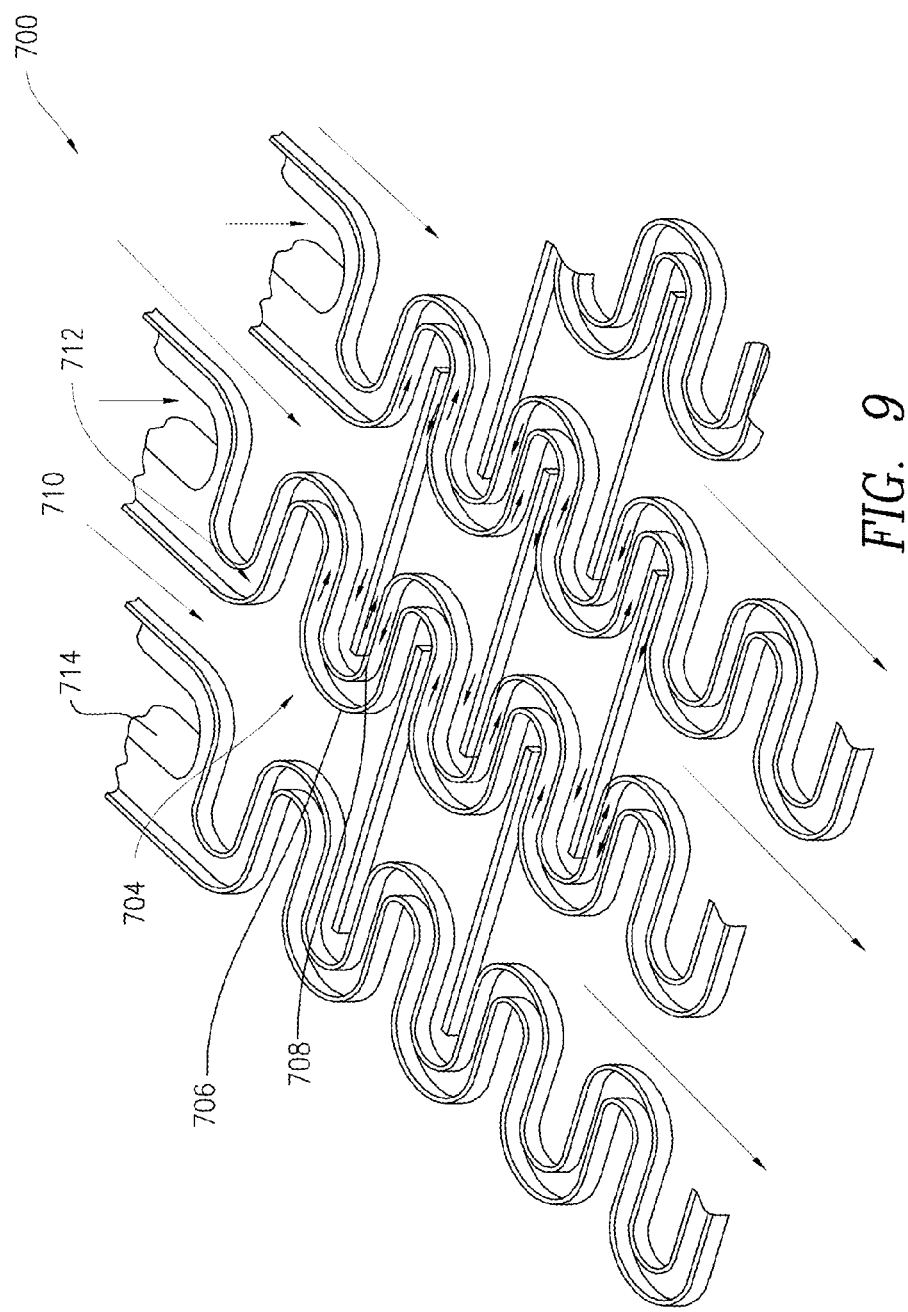
FIG. 9 is another close-up perspective view of the example filter device of FIG. 8 illustrating fluid flow through the filtering labyrinths.

FIG. 8 illustrates a plurality of sets of labyrinth filter structures and channels, which are illustrated in greater detail in FIG. 9. A first labyrinth filter structure 704 is comprised of serpentine sidewalls, such as sidewalls 706 and 708. The labyrinth filter structures are spaced apart from one another to form input fluid channels, such as input fluid channel 710. The fluid passes around of the labyrinth filter structures. Outlet channels, such as outlet channel 712, formed in between the sidewalls 706 and 708, provide a path for filtered fluid to exit the filter panel through their respective outlet apertures, such as outlet aperture 714.

The sidewalls 706 and 708 each comprise filter features such as slits, grooves, notches and the like that filter a portion of the fluid passing through the input fluid channels. Of note, only a portion of the filter features are illustrated in FIG. 9. The remainder are illustrated in FIG. 11.

As the fluid crosses the filter features of the sidewalls 706 and 708 the fluid is directed along the outlet channels and out of their respective outlet apertures.

In some embodiments, conductive/charged layers can be deposited or layered slightly below the flow channels to create an electric field. In general, the surface of the filter panels (front and/or back) are coated with a material that provides an electric potential.

Figure 10:
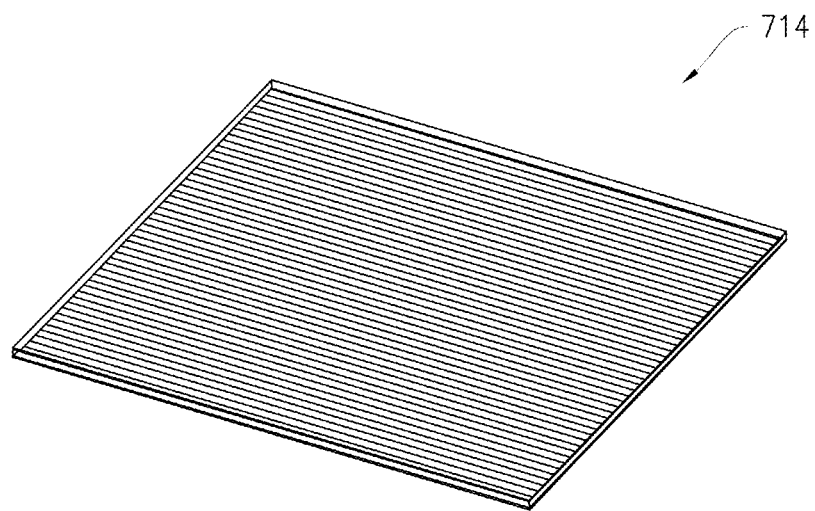
FIG. 10 illustrates an example cover plate for use with the example filter device of FIG. 7.
Figure 11:
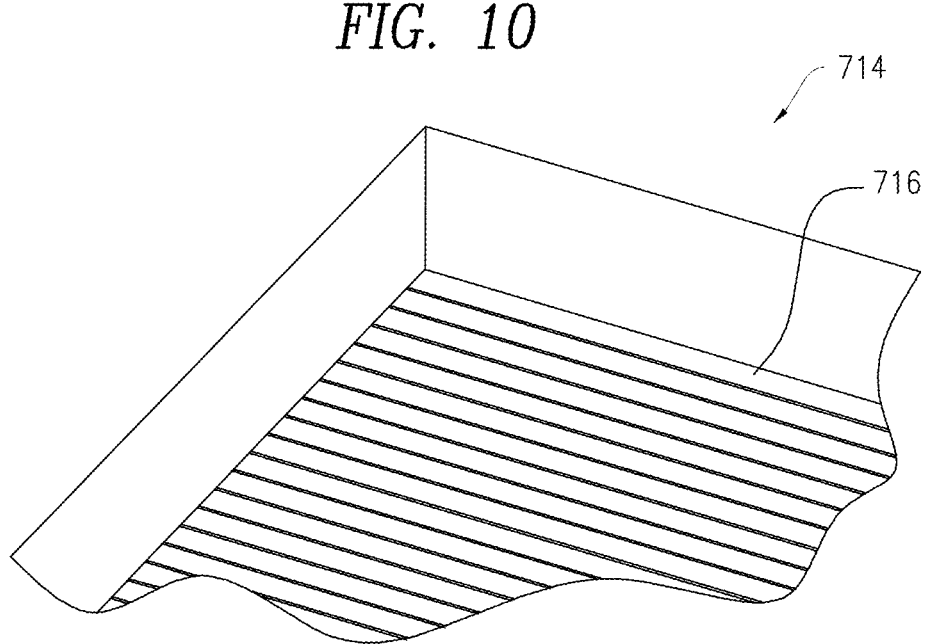
FIG. 11 is a close-up perspective view of the cover plate of FIG. 10.
Figure 12:
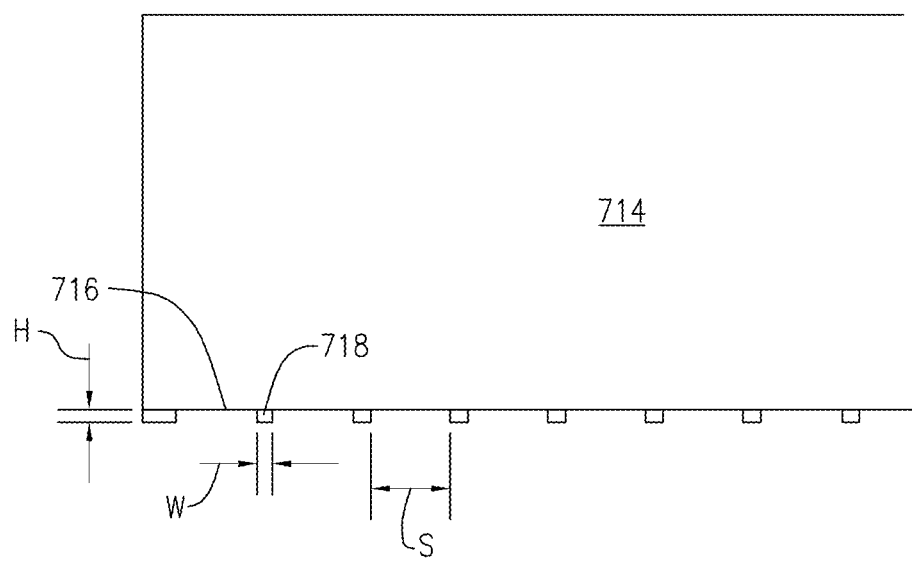
FIG. 12 is a side elevation view of a portion of the cover plate of FIG. 10.

FIGS. 10 and 11 collectively illustrate a cover plate 716 that is placed over the filtering surface of the filter panel 700 to enclose the input fluid channels and output channels. In some embodiments, the cover plate 716 comprises micro or nano structures, such as matching micro-channels. FIG. 12 illustrates a detail cross sectional view of a micro-structure surface of the cover plate 716 that comprises a conductive layer 718 that is approximately one micrometer in thickness in some embodiments. Filter objects, such as filter object 720 (which create filter features when the cover plate is joined to the filter panel 700), can be approximately 20 micrometers in width "W", one micrometer in height "H". The filter objects are spaced "S" approximately 120 micrometers apart from one another.

Figure 13:
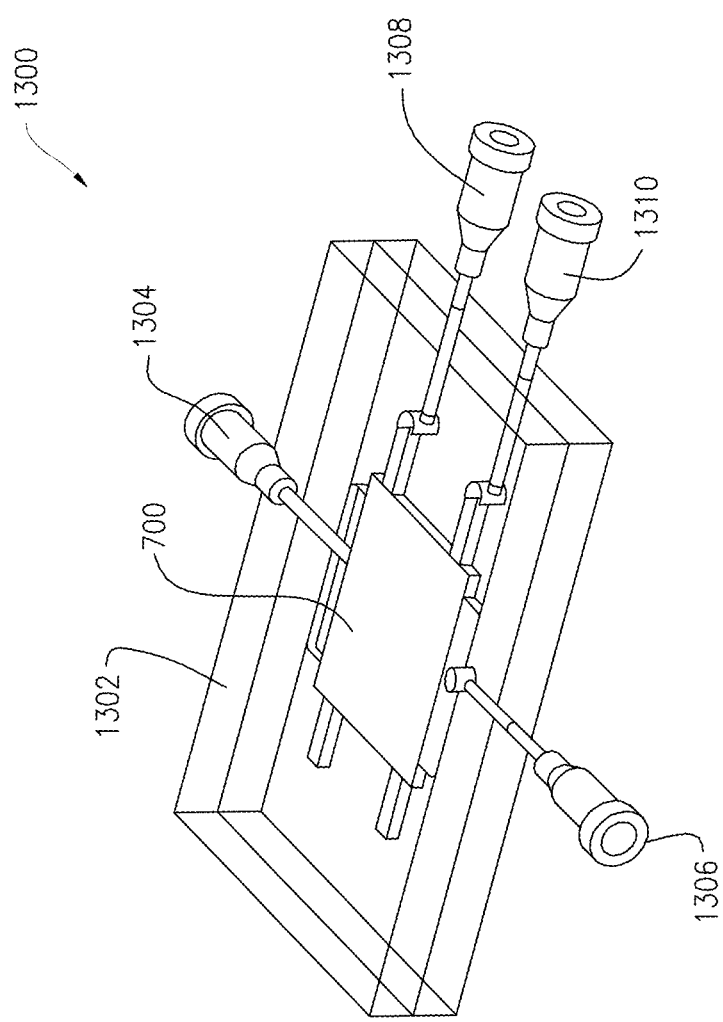
FIG. 13 is a perspective view of an example test fixture that comprises the example filter device of FIG. 7.

FIG. 13 illustrates an example test fixture 1300 that comprises the example filter device 700 of FIGS. 7-12. The test fixture 1300 comprises a housing 1302, an inlet 1304, a concentrate outlet 1306, and filtered fluid outputs 1308 and 1310.

Figure 14:
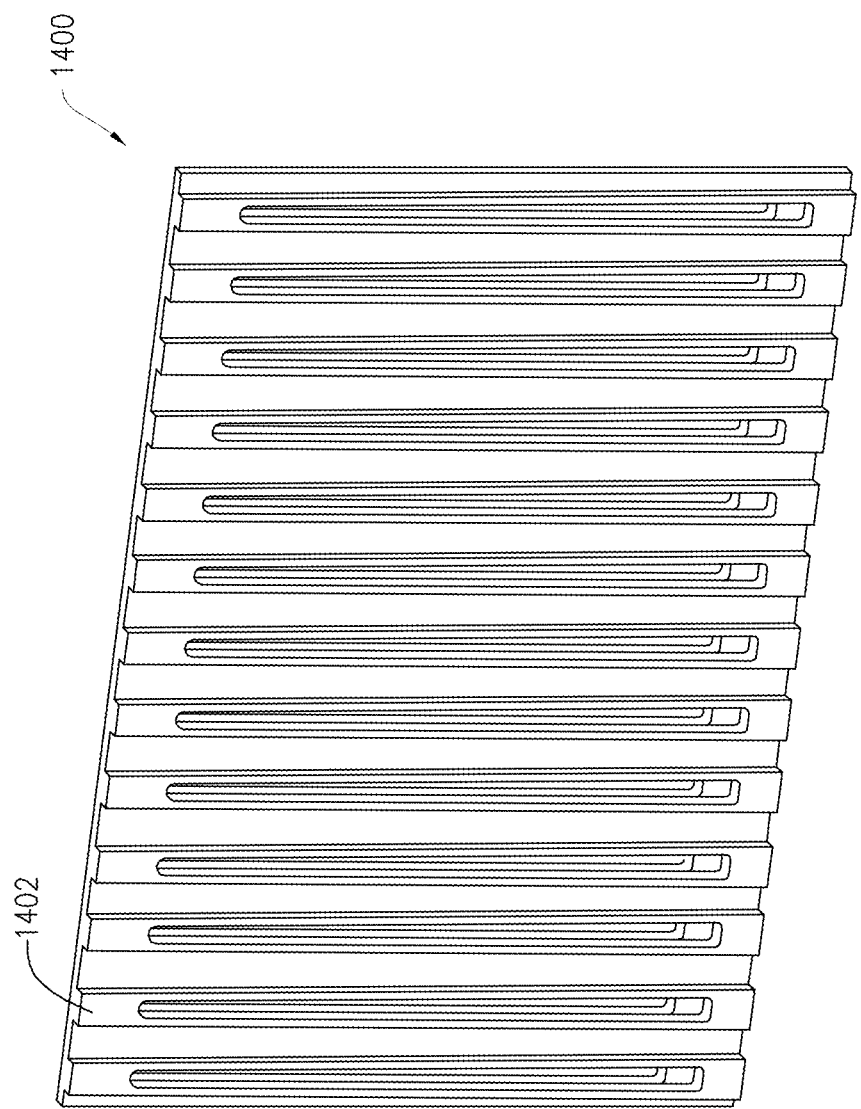
FIG. 14 is a perspective view of another example filter device of the present disclosure.
Figure 15:
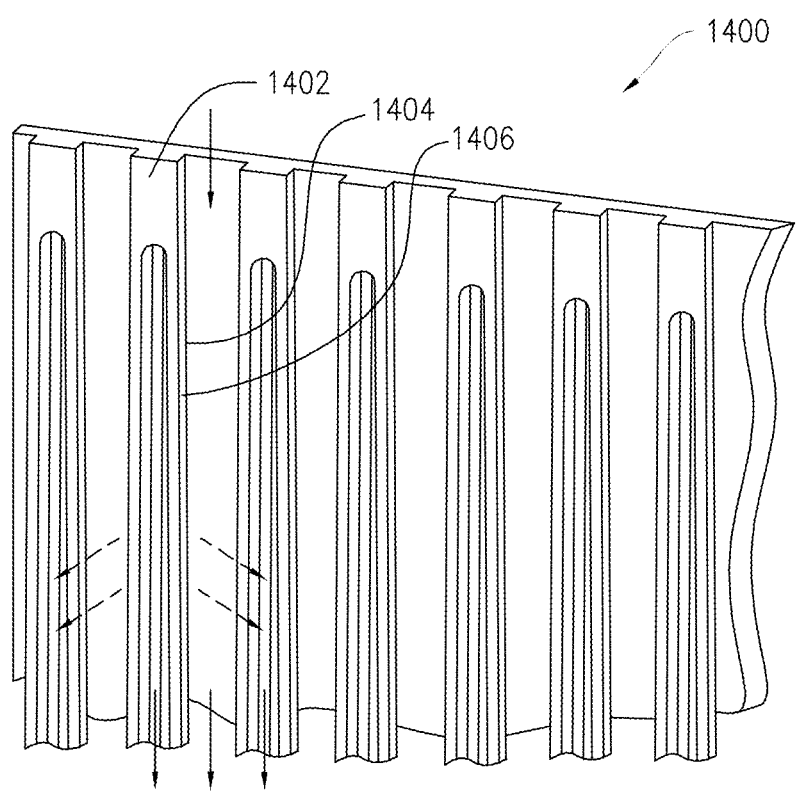
FIG. 15 is a close-up perspective view of the filter device of FIG. 14 comprising slit type filter features formed in filter structures.

FIGS. 14 and 15 collectively illustrate another example filter panel 1400 that can be used in a filter device that is similar to the filter device 100 described above. The filter panel is constructed similarly to the filter panel described above but with filter features that comprise slots that are fabricated into the sidewalls of the filter structures. For example, filter structure 1402 comprises a sidewall 1404 that comprises slots, such as slot 1406. Fluid flow is illustrated by the arrows where fluid flows from primary channels into filter structure trenches.

The illustrations of FIGS. 16-21 depict fluidic flow through microfluidic channels that can be used to control ions in solution for a wide range of uses such as producing fresh water from sea water, removing unwanted ions from waste water, and reducing unwanted ions from household water, a water softener—just to name a few.

Semiconductor and or nano accurate machining equipment can be used to make tooling to replicates nano-sized features in plastic (credit card hologram and CDs are examples). In some cases they can be used to manufacture nano-sized features. Multiphysics software has been used to show the operating parameters of a water softener microfluidic system.

Figure 16:
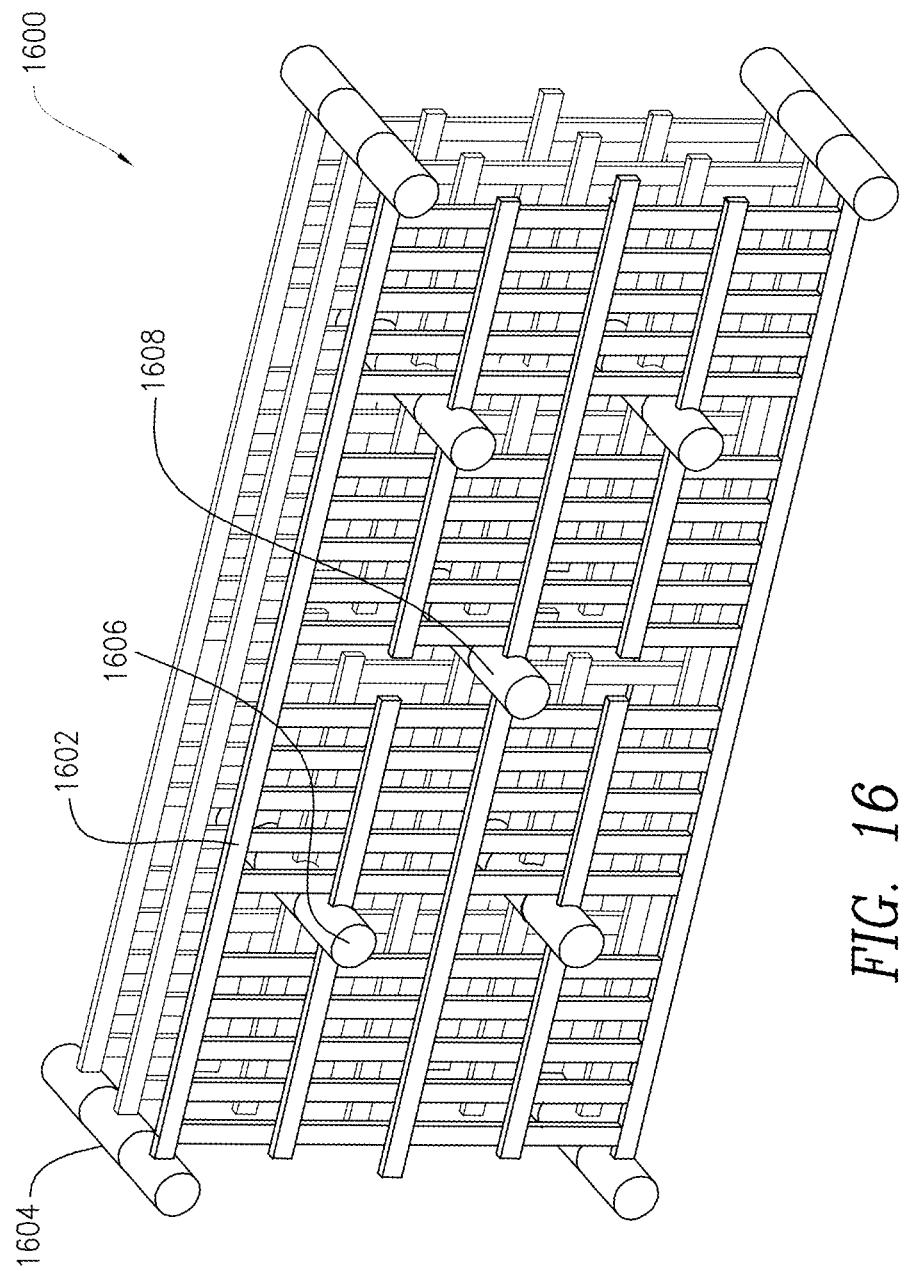
FIGS. 16-21 collectively illustrate a modeled fluidic flow and volume through an example filter device of the present disclosure.

FIG. 16 illustrates an example fluidic volume 1600 created by the use of stacked layers of filter panels, such as the filter panel 102 of the embodiments of filter devices above. The filter panels when stacked create cylindrical inlet flow (such as cylindrical inlet flow 1604) adjacent to one or more corners of the fluidic volume 1600. The cylindrical inlet flows of adjoining panels create an inlet path of fluid communication through the panels.

Positioned on opposing corners of the filter panel 1602 are dilute outlet flows, such as dilute outlet flow 1608, which cooperate to create a discharge of dilute portions of the fluid that have been filtered through the filter device.

In some embodiments, the fluidic volume 1600 also includes cylindrical concentrate outlet flows, such as concentrate outlet flow 1606, positioned within the lattice structure of the individual panels.

Figure 17:
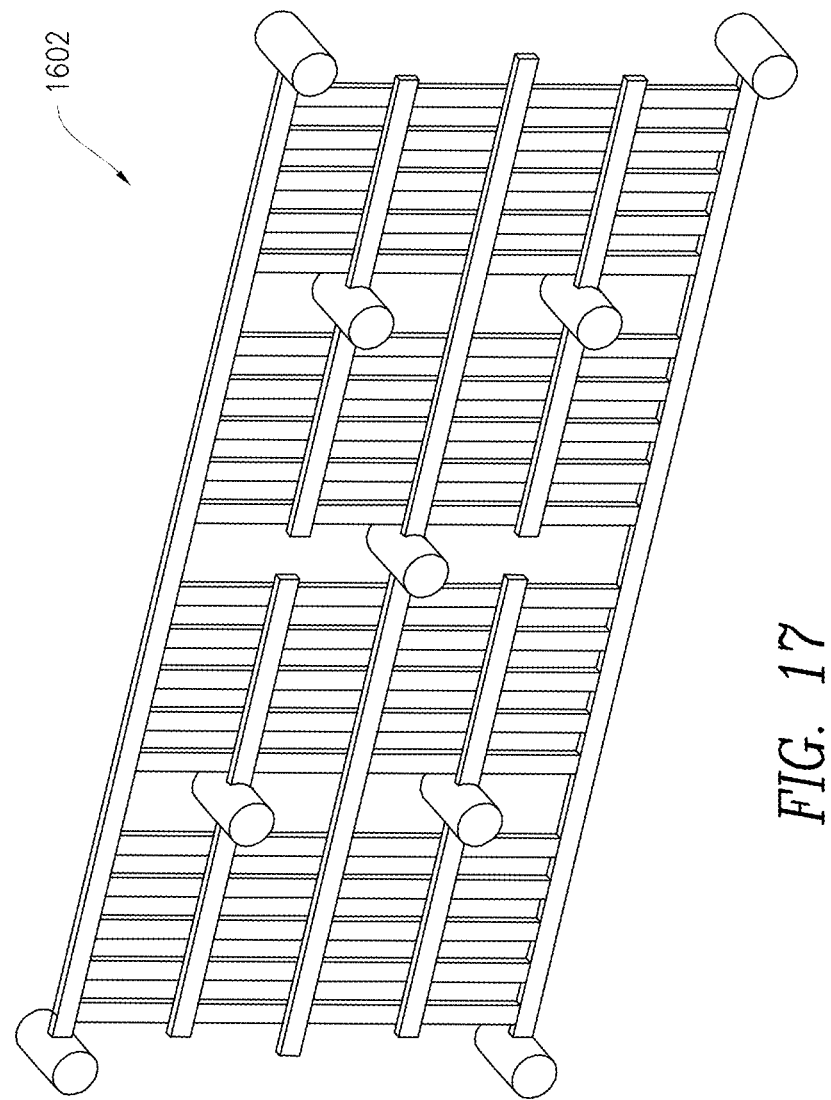

A view of a small portion of a fluidic volume 1600 is illustrated in FIG. 17.

Figure 18:
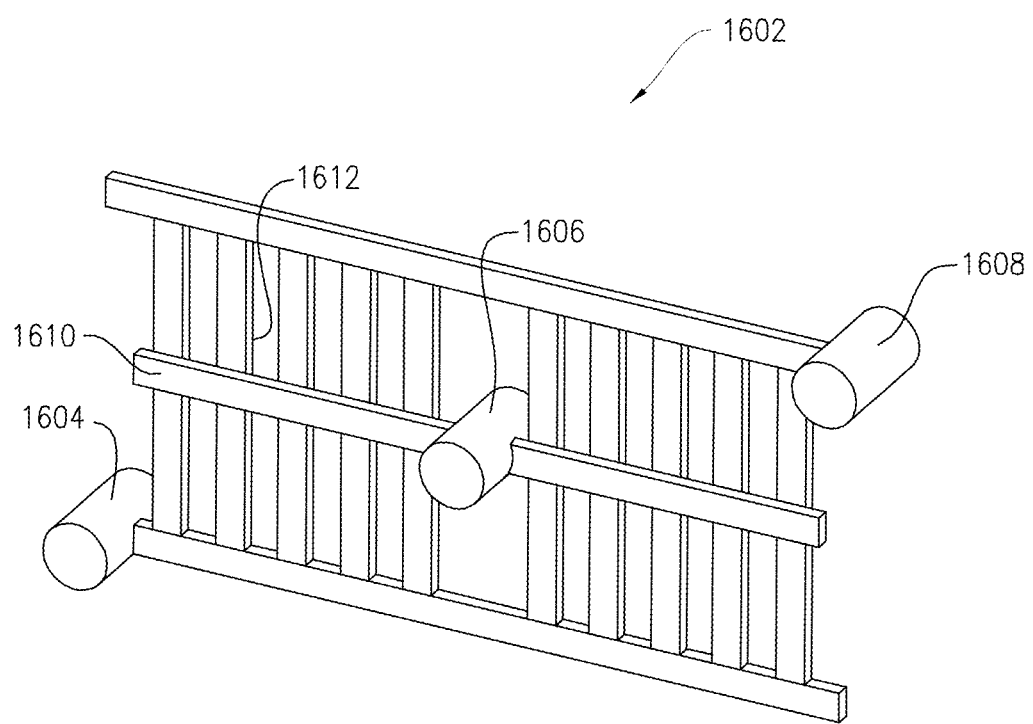

FIG. 18 is a close-up view of a portion of the portion of the fluidic volume 1600 illustrating a lattice flow pattern created by the filter device. In one embodiment, the lattice flow pattern comprises a plurality of longitudinal flow paths, such as longitudinal flow path 1610. The lattice flow pattern also includes a plurality of flow paths, such as latitudinal flow path 1612, that extend perpendicularly to the longitudinal flow paths. To be sure, the latitudinal flow paths are created by fluid flow through the filter features of the filter device and the longitudinal flow paths are created by the channels between adjacent filter structures of the filter device.

The close up view in FIG. 18 illustrates a single cylindrical inlet flow 1604, concentrate outlet flow 1606, and dilute outlet flow 1608.

In one embodiment, each of the latitudinal filtering members and the longitudinal filtering members comprise an arrangement of surfaces that are charged to attract specific anions and cations in a fluid passed through the filter device.

Figure 19:
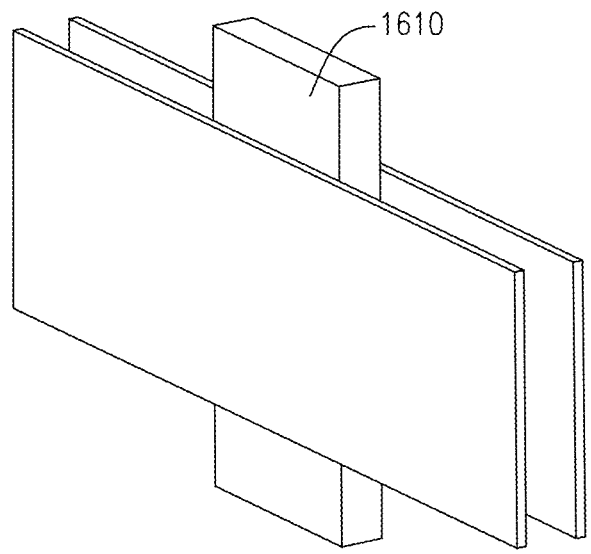

FIG. 19 is a yet closer view the intersection of the longitudinal flow path 1610 and the latitudinal flow path 1612. The longitudinal flow path 1610 comprises a rectangular tubular conduit that functions as a pathway for dilute fluid transmission to the concentrate outlet flow 1606.

The latitudinal flow path 1612 comprises an anion concentration 1614 and a cation concentration 1616 which are spaced apart by the longitudinal flow path 1610. As fluid communicates through the filter device anions are attracted by a charged surface of the filter panel and cations are attracted an opposing charged surface of an adjacent panel. The anions and cations will travel outwardly towards opposing ends filter device.

Figure 20:
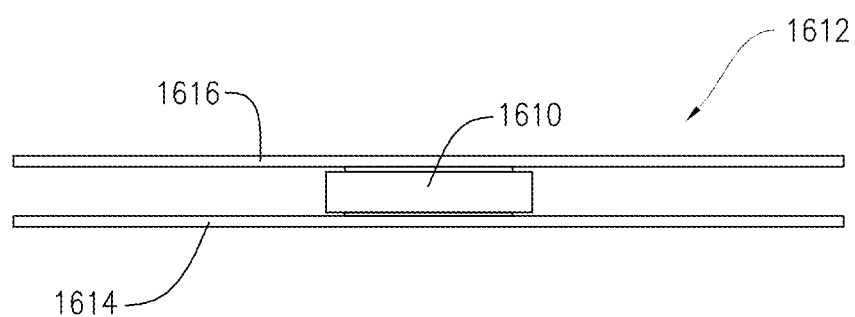
Figure 21:
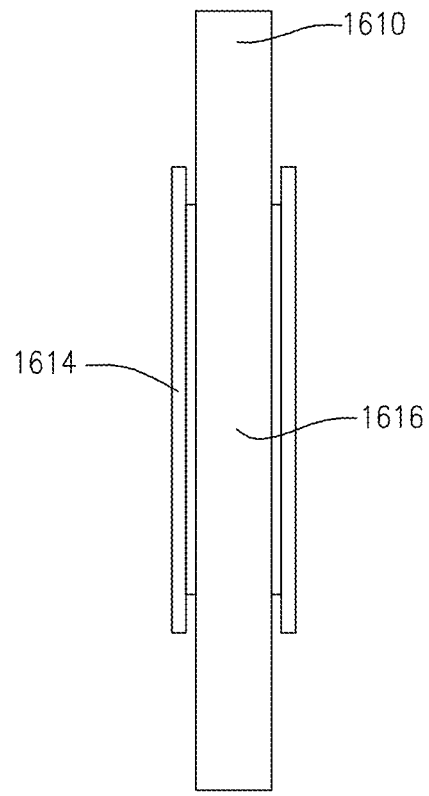

A top down view of the portion of the fluidic volume 1600 is illustrated in FIG. 20, and FIG. 21 illustrates a side elevation view of the portion of the filter panel 1602.

Figures 22A, 22B:
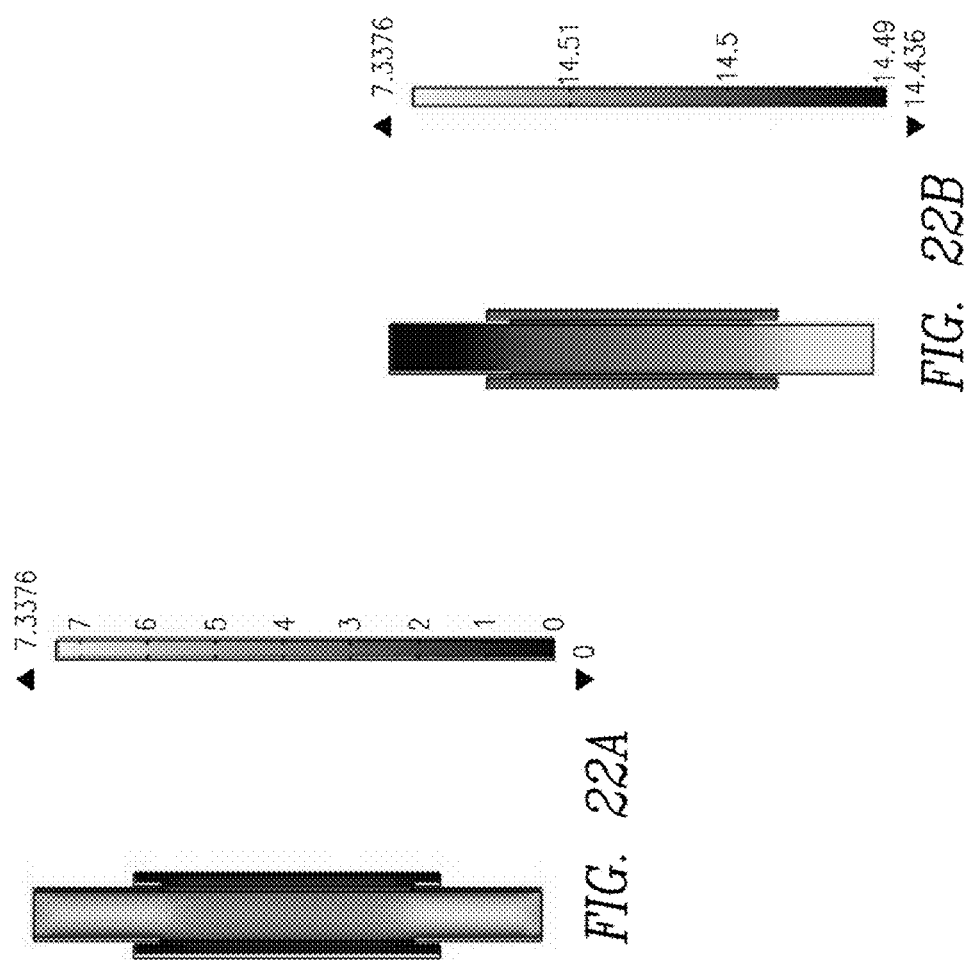

FIG. 22A illustrates a vertical cut plot of fluid velocity over the portion of the fluid volume illustrated. FIG. 22B illustrates a vertical cut plot of fluid pressure over the portion of the fluid volume illustrated. FIG. 22C illustrates an electrical potential cut plot of the of the portion of the filter panel 1602 where an electric potential is applied across the flow path to manage the location of the various types of ions. FIG. 22D illustrates a plot of ionic concentration (84×max) in relation to the initial solution concentration of (calcium Ca+2 ions). That is, the +2 ions are expelled in a high concentration from an uppermost area of a latitudinal flow region 2202 of the fluid volume.

Figures 23A, 23B:
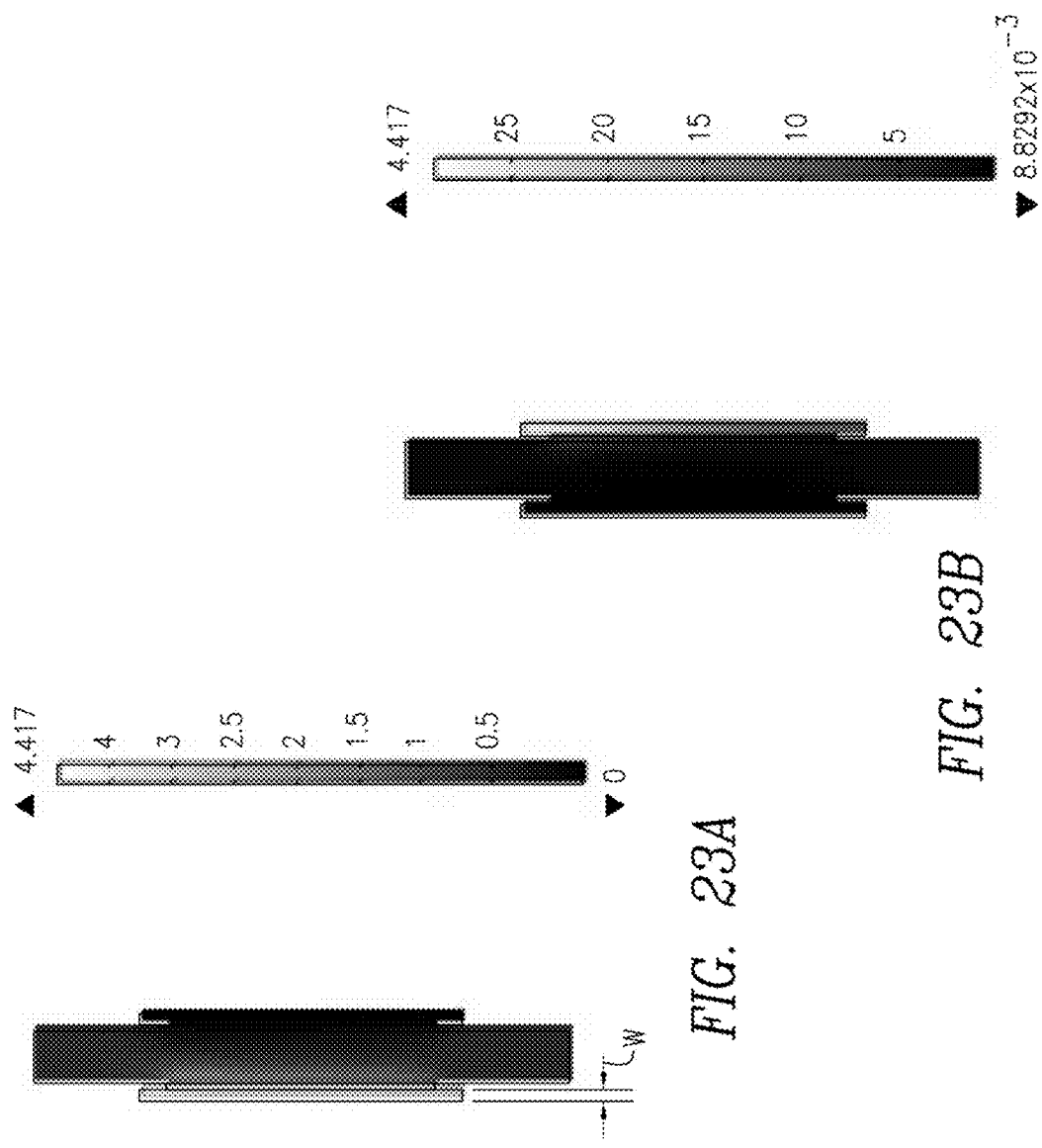
FIGS. 23A-C illustrate additional cut plot graphs a portion of a filtering plate of the example filter device of FIGS. 16-21.

FIG. 23A illustrates a plot of the portion of the fluid volume having concentrated cations (specifically Na+1), which is approximately 4.4×initial concentration maximum. A width W of a latitudinal flow of the fluidic flow is directly proportional to the size of the filter features of the filter device. Changes to the size of the filter features affect the ions separated from the fluidic flow.

Figure 23C:
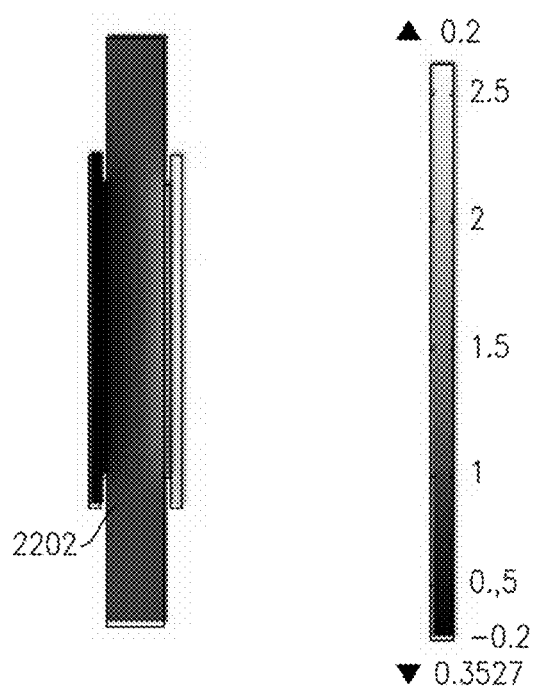

FIG. 23B illustrates a plot of the portion of the fluid volume illustrated where −2 charged SO4 ions are attracted close to the right channel (28.9×max). FIG. 23C illustrates a plot of the portion of the fluid volume illustrated where −1 charged Cl ions are not attracted as close to the right channel as the SO4 ions (2.6×max).

Collectively, FIGS. 22A-23C illustrate ion separation simulations. With separation diffusion of the ions in solution is relevant, fluid flow rates and electric potential effect separation of ions from the fluid. Typically the pores need to be much smaller for exclusion than separation. With separation the viscosity, velocity, and diffusion rate of the ions in solution effect separation.

Reference throughout this specification to "one embodiment" or "an embodiment" means that a particular feature, structure, or characteristic described in connection with the embodiment is included in at least one embodiment of the present invention. Thus, the appearances of the phrases in "one embodiment" or in "an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, device, assembly, sub-assembly, component, and combinations thereof. Alternatively, in some embodiments the "means for" is expressed in terms of prose, or as a flow chart or a diagram.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "mechanically connected," etc., are used interchangeably herein to generally refer to the condition of being mechanically or physically connected. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," an and the are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A filter panel, comprising:
    a housing with at least one inlet and at least one outlet, each in communication with a plurality of filter structures;
    a substrate;
    at least one charged layer adapted to receive a charge so that an electric potential is applied to a fluid in the filter panel; and wherein
    the plurality of filter structures extending from the substrate, the plurality of filter structures being spaced apart from one another to define a plurality of input boundaries on a top surface of the substrate and a plurality of output boundaries on a lower surface of the substrate, each of the plurality of filter structures comprising a pair of sidewalls spaced apart from one another, the pair of sidewalls comprising filter features that allow passage of fluid from the plurality of input boundaries into an outlet aperture formed by the spacing of the pair of sidewalls, and a filter port disposed within each outlet aperture.

2. The filter panel according to claim 1, wherein the filter features comprise any one of grooves, notches, slits, indentations, and any combinations thereof.

3. The filter panel according to claim 1, wherein the substrate is charged with an electrical charge.

4. A filter device, comprising:
a housing with at least one inlet and at least one outlet, each in communication with a plurality of filter structures;
a plurality of filter panels in stacked arrangement, each comprising:
at least one charged layer adapted to receive a charge so that an electric potential is applied to a fluid in the filter device;
a substrate having a front surface and a back surface; and
the plurality of filter structures extending from the front surface of the substrate, the plurality of filter structures being spaced apart from one another to define a plurality of input boundaries on a top surface of the substrate and a plurality of output boundaries on a lower surface of the substrate, each of the plurality of filter structures comprising a pair of sidewalls spaced apart from one another, the pair of sidewalls comprising filter features that allow passage of fluid from the plurality of input boundaries into an outlet aperture formed by the spacing of the pair of sidewalls, and a filter port disposed within each outlet aperture, wherein the plurality of filter panels are stacked so that the plurality of filter structures of one filter panel abuts the back surface of an adjacent filter panel.

5. The filter device according to claim 4, wherein the back surfaces of the plurality of filter panels comprise either a positively charged layer or negatively charged layer and the front surfaces comprise an oppositely charged layer relative to the back surfaces.

6. The filter device according to claim 4, wherein the outlet cavities of the plurality of filter panels are sized to create a staggered arrangement.

7. The filter device according to claim 4, wherein the filter features comprise slits that provide filtering of particulates in a fluid by passing the fluid received from input channels formed between the plurality of filter structures into the spaces between the pair of sidewalls of the plurality of filter structures.

8. The filter device according to claim 4, wherein the outlet cavities of the plurality of filter panels provide a continuous opening between a front of the filter device and a back of the filter device.

9. The filter device according to claim 4, wherein the plurality of filter structures comprise a pattern of grooves or notches on upper surfaces of the plurality of filter structures, the pattern of grooves or notches defining contact surfaces.

10. The filter device according to claim 9, wherein the filter features are created by mating of the plurality of filter structures of the one filter to the back surface of an adjacent filter panel such that the contact surfaces mate with the back surface and the grooves or notches create lateral pathways that extend at an angle relative to the plurality of filter structures.

11. The filter panel according to claim 4, wherein the filter features comprise any one of grooves, notches, slits, indentations, and any combinations thereof.

12. The filter panel according to claim 4, wherein the plurality of filter structures are spaced apart from one another to form primary channels that extend between the plurality of input boundaries and the plurality of output boundaries.

13. The filter panel according to claim 12, wherein the spacing of the pair of sidewalls form a trench that receives filtered fluid when fluid is passed through the filter device, wherein the filtered fluid exits the filter device from the outlet cavities, which are disposed within the trenches.

14. The filter panel according to claim 13, wherein the filter features provide secondary channels of fluid communication between the primary channels and the trenches.

15. The filter panel according to claim 14, further comprising a cover panel that comprise a flat surface that mates with an uppermost one of the plurality of filter panels to cover the plurality of filter features of the uppermost one of the plurality of filter panels.

16. A method for filtering a fluid, the method comprising:
introducing a fluid into a filter device, the filter device comprising:
a plurality of filter panels in stacked arrangement, each comprising:
a housing with at least one inlet and at least one outlet, each in communication with a plurality of filter structures;
a substrate having a front surface and a back surface; and
a plurality of filter structures extending from the front surface of the substrate, the plurality of filter structures including at least one charged layer adapted to receive a charge so that an electric potential is applied to a fluid in the filter device, the plurality of filter structures being spaced apart from one another to define a plurality of input boundaries on a top surface of the substrate and a plurality of output boundaries on a lower surface of the substrate, each of the plurality of filter structures comprising a pair of sidewalls spaced apart from one another, the pair of sidewalls comprising filter features that allow passage of fluid from the plurality of input boundaries into an outlet aperture formed by the spacing of the pair of sidewalls, and a filter port disposed within each outlet aperture, wherein the plurality of filter panels are stacked so that the plurality of filter structures of one filter panel abuts the back surface of an adjacent filter panel;
wherein the fluid passes through the plurality of input boundaries, at least a portion of the fluid is filtered across the filter features of the plurality of filter structures, further wherein filtered fluid passes out of the filter device from the outlet cavities and a concentrate created by filtering the fluid exits from the plurality of output boundaries.

17. The method according to claim 16, wherein the back surfaces of the plurality of filter panels comprise either a positively charged layer or negatively charged layer and the front surfaces comprise an oppositely charged layer relative to the back surfaces.

18. The method according to claim 17, further comprising inducing an electrical field in the fluid to attract anions and cations to their respective layers.

19. The method according to claim 17, further comprising selectively varying strength of the electrical field over time.

* * * * *